(12) United States Patent
Liu et al.

(10) Patent No.: US 11,790,688 B2
(45) Date of Patent: Oct. 17, 2023

(54) FINGERPRINT RECOGNITION PANEL AND DISPLAY DEVICE

(71) Applicants: Beijing BOE Display Technology Co., Ltd., Beijing (CN); BOE Technology Group Co., Ltd., Beijing (CN)

(72) Inventors: Yi Liu, Beijing (CN); Shijun Wang, Beijing (CN); Wenkai Mu, Beijing (CN); Bo Feng, Beijing (CN); Jun Fan, Beijing (CN); Xinlan Yang, Beijing (CN); Yang Wang, Beijing (CN); Zhan Wei, Beijing (CN); Tengfei Ding, Beijing (CN); Yingzi Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 114 days.

(21) Appl. No.: 17/414,034

(22) PCT Filed: Sep. 11, 2020

(86) PCT No.: PCT/CN2020/114883
§ 371 (c)(1),
(2) Date: Jun. 15, 2021

(87) PCT Pub. No.: WO2022/052060
PCT Pub. Date: Mar. 17, 2022

(65) Prior Publication Data
US 2022/0309825 A1    Sep. 29, 2022

(51) Int. Cl.
*G06V 40/13*         (2022.01)

(52) U.S. Cl.
CPC ............... *G06V 40/1318* (2022.01)

(58) Field of Classification Search
None
See application file for complete search history.

(56) References Cited

U.S. PATENT DOCUMENTS

2021/0210557 A1* 7/2021 Lim ............... H01L 27/323
2021/0407453 A1* 12/2021 Shih .............. G09G 3/3648

* cited by examiner

*Primary Examiner* — Joseph R Haley
(74) *Attorney, Agent, or Firm* — ArentFox Schiff LLP; Michael Fainberg

(57) ABSTRACT

The fingerprint recognition panel includes fingerprint recognition circuits arranged in a matrix, reading signal lines, a gate driving circuit and scanning lines connected with the gate driving circuit. The gate driving circuit is for outputting scanning signals to the scanning lines successively; each fingerprint recognition circuit is in connection with two scanning lines, a reading control end is connected with a first scanning line, and a reset control end is connected with a second scanning line; the first scanning line in connection with the fingerprint recognition circuits of the $n^{th}$ row and the second scanning line in connection with the fingerprint recognition circuits of the $(n-m)^{th}$ row are the same; or the second scanning line in connection with the fingerprint recognition circuits of the $n^{th}$ row and the first scanning line in connection with the fingerprint recognition circuits of the $(n-m)^{th}$ row are the same.

11 Claims, 12 Drawing Sheets

FINGERPRINT RECOGNITION PANEL AND DISPLAY DEVICE

CROSS REFERENCE TO RELATED APPLICATIONS

This application is a national phase entry under 35 U.S.C. § 371 of International Application No. PCT/CN2020/114883, filed on Sep. 11, 2020, the entire content of which is incorporated herein by reference.

FIELD

The present disclosure relates to the technical field of touch control, in particular to a fingerprint recognition panel and a display device.

BACKGROUND

In recent years, with the rapid development of touch control technology, mobile products with a biological recognition function have gradually entered people's life and work, and fingerprint technology has attracted people's attention because of its unique identity. Pressing and sliding fingerprint recognition technologies based on a silicon-base technique have been integrated into the mobile products, and the core of people's attention in the future is the fingerprint recognition technology in a display area.

At present, the fingerprint recognition technology mainly refers to collection of fingerprint images based on use of a photo-electric sensor. However, in the prior art, there is a problem about a large signal-to-noise ratio for fingerprint recognition.

SUMMARY

Embodiments of the present disclosure provide a fingerprint recognition panel and a display device as follows.

A fingerprint recognition panel provided by embodiments of the present disclosure include a plurality of fingerprint recognition circuits arranged in a matrix, a plurality of reading signal lines, a gate driving circuit and a plurality of scanning lines connected with the gate driving circuit. Each fingerprint recognition circuit includes a reset module, a photo-electric conversion module, a driving transistor and a reading control module.

The gate driving circuit is configured to output scanning signals to the plurality of scanning lines successively.

In each fingerprint recognition circuit, the reset module is connected with a reset control end, a reset signal end and a gate of the corresponding driving transistor respectively and configured to provide a signal of the reset signal end to the gate of the corresponding driving transistor under control of the reset control end; the photo-electric conversion module is connected with the gate of the driving transistor and configured to convert a photo signal to an electric signal; a source electrode of the driving transistor is connected with a reference voltage end, and a drain electrode of the driving transistor is connected with the corresponding reading control module and configured to output a signal to the corresponding reading control module under control of a gate potential of the driving transistor; and the reading control module is connected with a reading control end, a signal output end and the drain electrode of the corresponding driving transistor respectively and configured to provide the signal output by the corresponding driving transistor to the signal output end under control of the reading control end.

The fingerprint recognition circuits in each row are in corresponding connection with the two different scanning lines respectively. The reading control ends of the reading control modules are connected with a first scanning line, and the reset control ends of the reset modules are connected with a second scanning line; and the signal output ends of the fingerprint recognition circuits of the same column are in corresponding connection with one of the reading signal lines respectively.

The first scanning line in corresponding connection with the fingerprint recognition circuits of the $n^{th}$ row and the second scanning line in corresponding connection with the fingerprint recognition circuits of the $(n-m)^{th}$ row are the same scanning line; or the second scanning line in corresponding connection with the fingerprint recognition circuits of the $n^{th}$ row and the first scanning line in corresponding connection with the fingerprint recognition circuits of the $(n-m)^{th}$ row are the same scanning line; n is a positive integer larger than 1 and smaller than or equal to N; N is the total number of rows of the fingerprint recognition circuits, and is larger than 1; and m is a positive integer smaller than n.

Optionally, in the fingerprint recognition panel, $m=1$.

Optionally, each reading control module includes a first switch transistor.

A first electrode of the first switch transistor is connected with the drain electrode of the corresponding driving transistor, a gate of the first switch transistor is connected with the corresponding reading control end, and a second electrode of the first switch transistor is connected with the corresponding signal output end.

Optionally, each photo-electric conversion module includes a capacitor and a photo-electric diode. A cathode of the photo-electric diode is connected with the gate of the corresponding driving transistor, and the capacitor is in parallel connection with the photo-electric diode.

Optionally, each reset module includes a second switch transistor. A first electrode of the second switch transistor is connected to the corresponding reset signal end, and a second electrode of the second switch transistor is connected with the gate of the corresponding driving transistor; and a gate of the second switch transistor is connected with the corresponding reset control end.

Optionally, the fingerprint recognition panel further includes a plurality of reset signal lines and a plurality of reference voltage lines.

The reset signal ends of the fingerprint recognition circuits of each row or the reset signal ends of the fingerprint recognition circuits of each column are in corresponding connection with one of the reset signal lines respectively.

The reference voltage ends of the fingerprint recognition circuits of each row or the reference voltage ends of the fingerprint recognition circuits of each column are in corresponding connection with one of the reference voltage lines respectively.

Optionally, the reset signal ends of the fingerprint recognition circuits of each row are in corresponding connection with one of the reset signal lines respectively.

Both the reset signal lines and the scanning lines extend in a row direction.

The reset signal lines and the scanning lines are disposed to be at a same layer and of a same material.

Optionally, the reset signal ends of the fingerprint recognition circuits of each column are in corresponding connection with one of the reset signal lines respectively.

Both the reset signal lines and the reading signal lines extend in a column direction.

The reset signal lines and the reading signal lines are disposed to be at a same layer and of a same material.

Optionally, the reference voltage ends of the fingerprint recognition circuits of each row are in corresponding connection with one of the reference voltage lines respectively.

Both the reference voltage lines and the scanning lines extend in a row direction.

The reference voltage lines and the scanning lines are disposed to be at a same layer and of a same material.

Optionally, the reference voltage ends of the fingerprint recognition circuits of each column are in corresponding connection with one of the reference voltage lines respectively.

Both the reference voltage lines and the reading signal lines extend in a column direction.

The reference voltage lines and the reading signal lines are disposed to be at a same layer and a same material.

Correspondingly, the present disclosure further provides a display device including any of the fingerprint recognition panels.

DETAILED DESCRIPTION OF THE EMBODIMENTS

Figure 1:
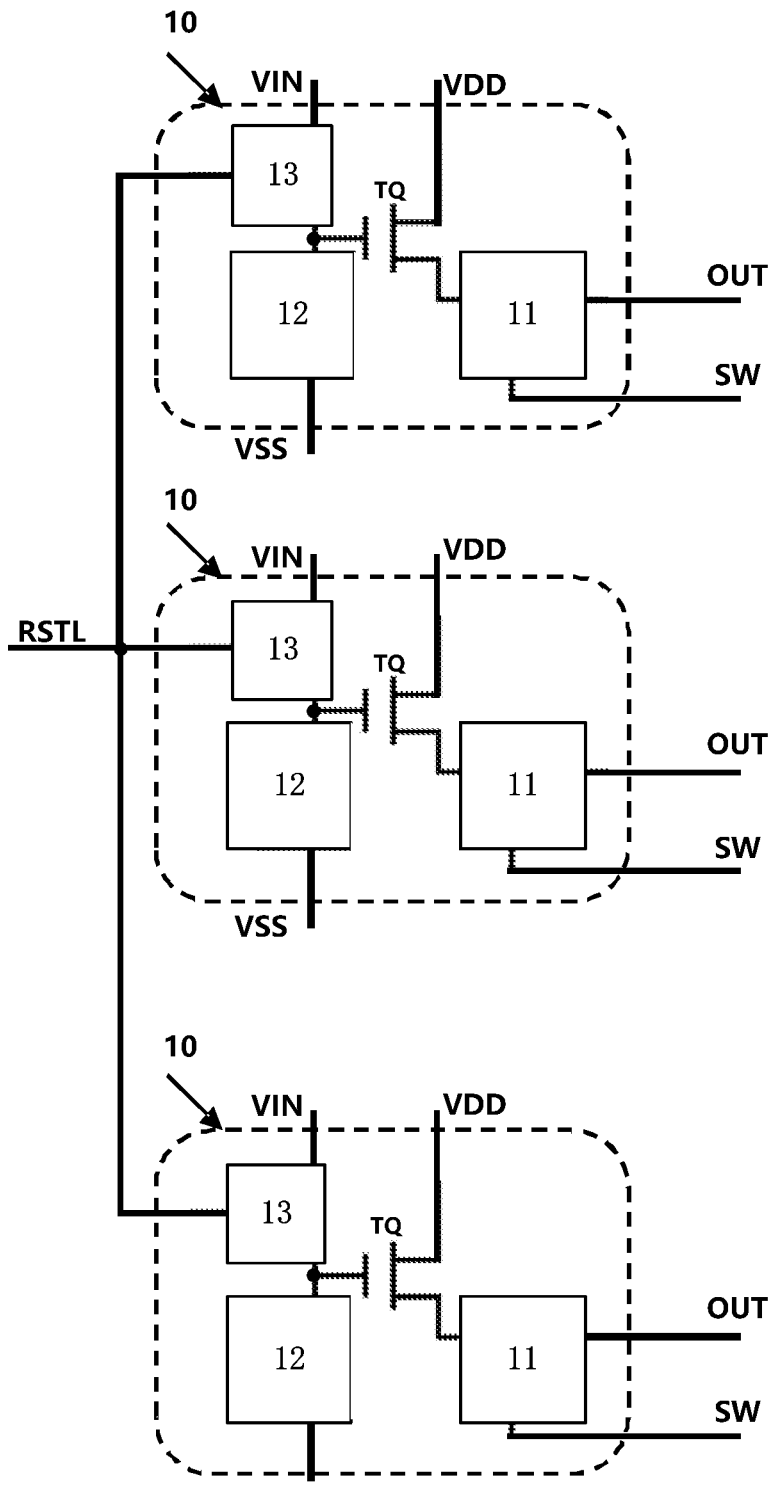
FIG. 1 is a schematic diagram of cascading of fingerprint recognition circuits in related art.
Figure 2:
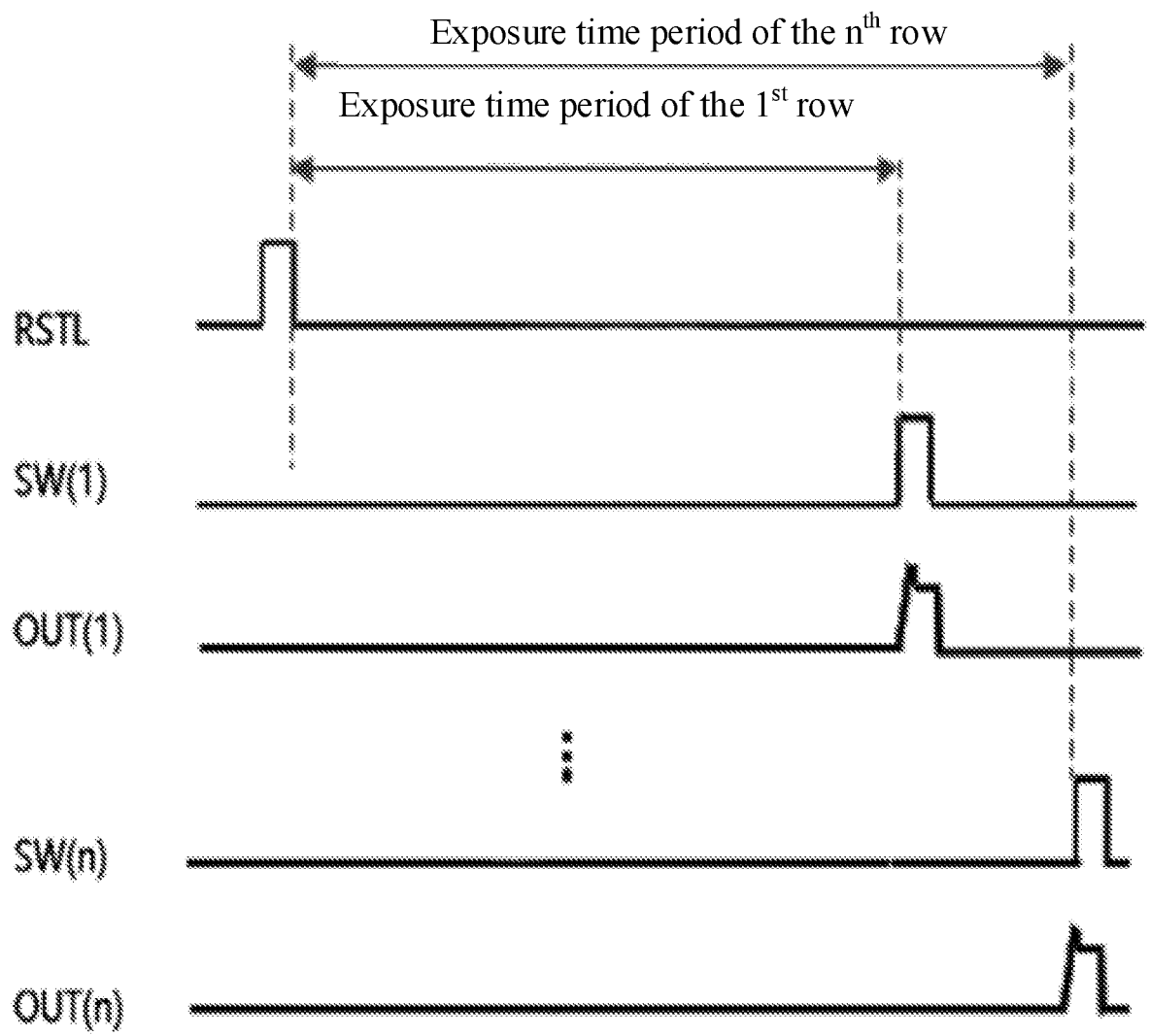
FIG. 2 is a sequence diagram corresponding to the fingerprint recognition circuits shown in FIG. 1.

In the related art, as shown in FIG. 1, a fingerprint recognition panel includes a plurality of rows of fingerprint recognition circuits 10. Each fingerprint recognition circuit 10 includes a reading control module 11, a photo-electric conversion module 12, a driving transistor TQ and a reset module 13. Control ends of the reset modules 13 of all the fingerprint recognition circuits U are connected with the same reset control line RSTL, and the control end of the reading control module 11 of the fingerprint recognition circuit 10 of the $n^{th}$ row is in corresponding connection with a reading control scanning line SW (n), and n is a positive integer smaller than or equal to the total number of rows of the fingerprint recognition circuits. A sequence diagram corresponding to work of the fingerprint recognition panel is shown in FIG. 2. In a reset stage, the reset control line RSTL controls the reset modules 13 of all the fingerprint recognition circuits 10 so as to reset gate potentials of the driving transistors. In a signal reading stage, under control of the reading control scanning lines SW(n), the reading control modules 11 of the fingerprint recognition circuits 10 are controlled row by row so as to output signals corresponding to output signals of the driving transistors TQ. The size of the output signal of the driving transistor TQ in each fingerprint recognition circuit 10 is decided by the gate potential of the driving transistor TQ, and the gate potential of the driving transistor is decided by the photo-electric conversion module in the fingerprint recognition circuit. When a fingerprint touch finger touches the fingerprint recognition panel, valleys and ridges of the fingerprint shield light to different extents, so that sizes of electric signals converted by the photo-electric conversion modules are different, resulting in different gate potentials of the driving transistors.

However, in the above fingerprint recognition panel, due to different exposure time periods of the photo-electric conversion modules 12 in the fingerprint recognition circuits of different rows, brightness of fingerprint images collected is not uniform, which influences accuracy of fingerprint recognition.

Based on this, the present disclosure provides a fingerprint recognition panel and a display device so as to solve the problem that the collected fingerprint images are differential in brightness and definition, and consequently a recognition capacity of a fingerprint recognition chip is influenced.

In order to make the above objects, features and advantages of the present disclosure more obvious and understandable, the present disclosure will be further explained with reference to the drawings and embodiments. However, the example embodiments may be implemented in many forms and should not be construed as limited to the embodiments set forth herein; on the contrary, these embodiments are provided to make the present disclosure more thorough and complete, and to fully convey the concept of example embodiments to those skilled in the art. In the drawings, the same drawing reference numerals denote the same or similar structures, and thus repeated descriptions thereof will be omitted. The words expressing position and direction described in the present disclosure are all illustrated with the drawings as an example, but they can also be changed as needed, and all the changes are included in the protection scope of the present disclosure. The drawings of the present disclosure are only used to illustrate the relative positional relationship and do not represent the true scale.

It should be noted that in the following description, specific details are set forth in order to fully understand the present disclosure. However, the present disclosure can be implemented in many other ways different from those described here, and those skilled in the art can make similar popularization without violating the connotation of the present disclosure. Therefore, the present disclosure is not limited by the specific embodiments disclosed below. The following description of the specification is a preferred implementation for implementing the present application, but the description is for the purpose of explaining the general principles of the present application, and is not intended to limit the scope of the present application. The scope of protection of the present application shall be as defined by the appended claims.

Next, the fingerprint recognition panel and the display device provided by the embodiments of the present disclosure will be explained with reference to the accompanying drawings.

A fingerprint recognition panel provided by the embodiments of the present disclosure, with m=1 as the case, as shown in FIG. 3 to FIG. 6, includes a plurality of fingerprint recognition circuits U(n,k) arranged in a matrix (n is a row sequence number of the fingerprint recognition circuits, and k is a column sequence number of the fingerprint recognition circuits), a plurality of reading signal lines OUT(k), a gate driving circuit 100 and a plurality of scanning lines SM(n) connected with the gate driving circuit 100. Each fingerprint recognition circuit U includes a reset module 03, a photo-electric conversion module 02, a driving transistor TQ and a reading control module 01. n is a positive integer larger than 1 and smaller than or equal to N; N is the total number of rows of the fingerprint recognition circuits, and is larger than 1; and k is a positive integer smaller than or equal to the total number of columns of the fingerprint recognition circuits.

The gate driving circuit 100 is configured to output scanning signals to the plurality of scanning lines SM(n) successively.

In each fingerprint recognition circuit U(n,k), the reset module 03 is connected with a reset control end RST(n), a reset signal end VIN(n,k) and a gate of the driving transistor TQ respectively and configured to provide a signal of the reset signal end VIN (n,k) to the gate of the driving transistor TQ under control of the reset control end RST(n). The photo-electric conversion module 02 is connected with the gate of the driving transistor TQ and a bias voltage end VSS and configured to convert a photo signal to an electric signal. A source electrode of the driving transistor TQ is connected with a reference voltage end VDD(n,k), and a drain electrode of the driving transistor TQ is connected with the reading control module 01 and configured to output a signal to the reading control module 01 under control of a gate potential of the driving transistor. The reading control module 01 is connected with a reading control end SW(n), a signal output end SOUT(n,k) and the drain electrode of the corresponding driving transistor TQ respectively and configured to provide the signal output by the driving transistor TQ to the signal output end under control of the reading control end SW(n).

Figure 5:
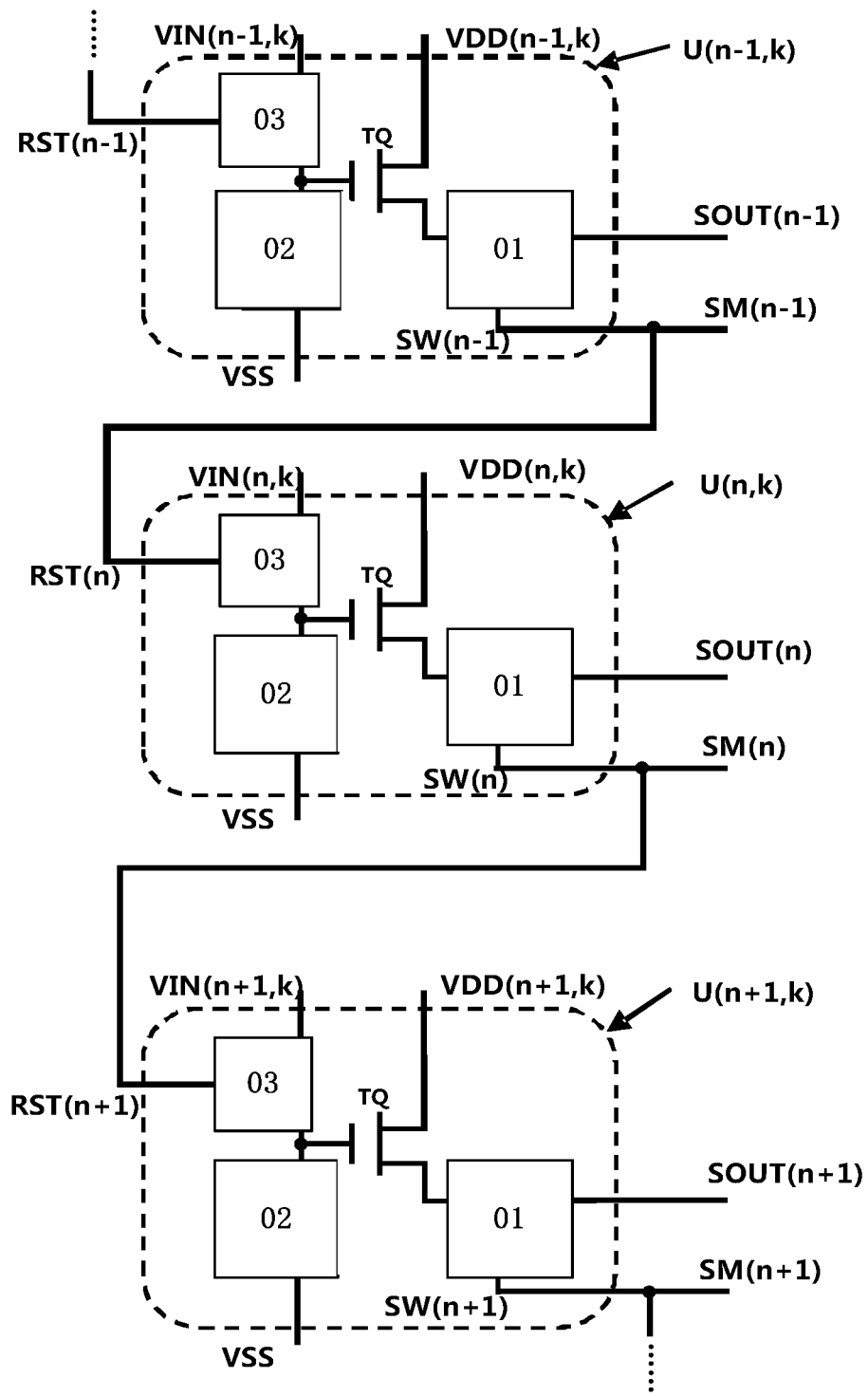
FIG. 5 is a first schematic structural diagram of cascading of fingerprint recognition circuits in a fingerprint recognition panel provided by an embodiment of the present disclosure.
Figure 6:
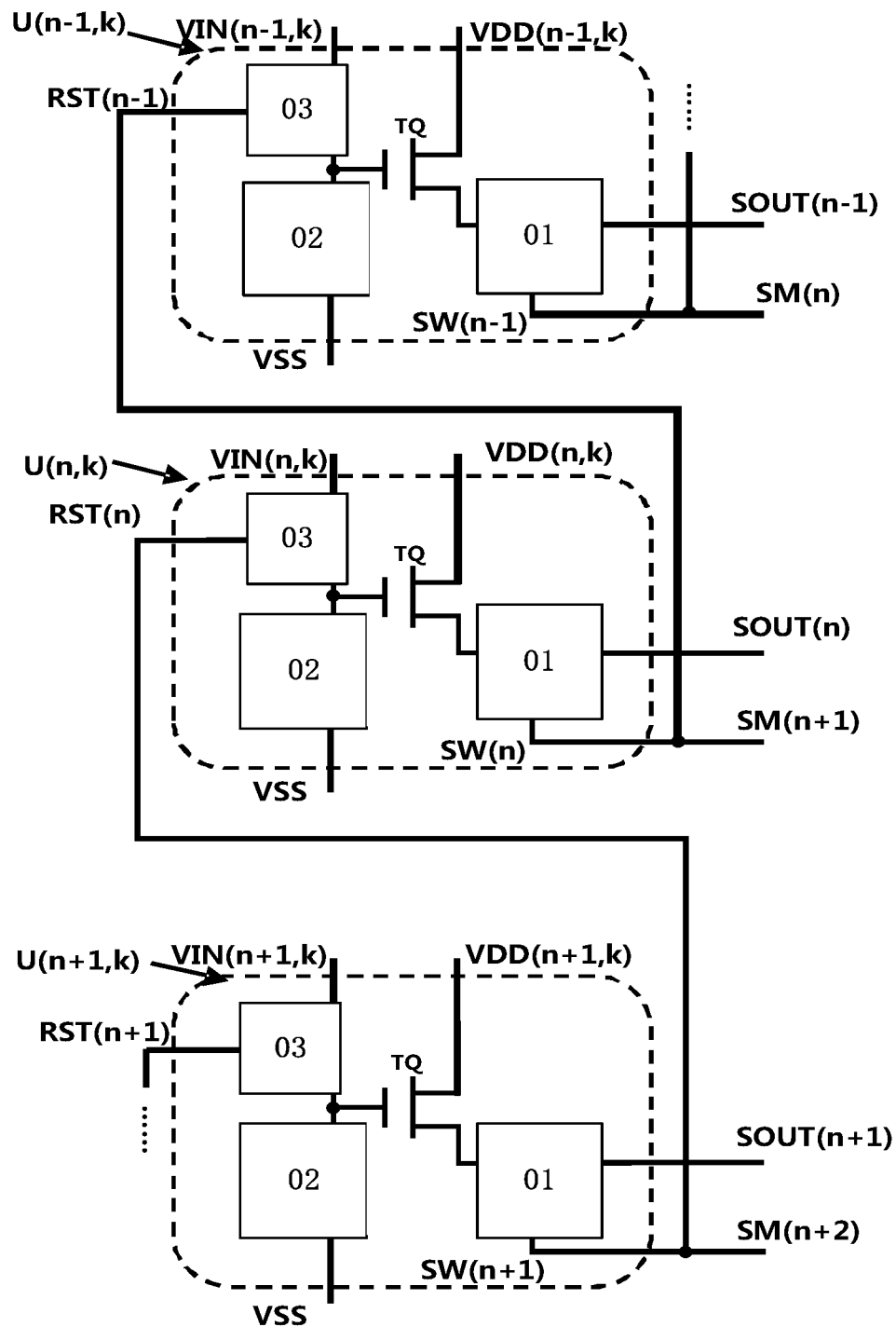
FIG. 6 is a second schematic structural diagram of cascading of fingerprint recognition circuits in a fingerprint recognition panel provided by an embodiment of the present disclosure.

The fingerprint recognition circuits U(n,k) of each row is in corresponding connection with two different scanning lines SM, and the signal output ends SOUT(n,k) of the fingerprint recognition circuits of the same column are in corresponding connection with one of the reading signal line OUT(k). As shown in FIG. 5 and FIG. 6, the reading control end SW(n) of the reading control module 01 is connected with a first scanning line, and the reset control end RST(n) of the reset module 03 is connected with a second scanning line.

Figure 3:
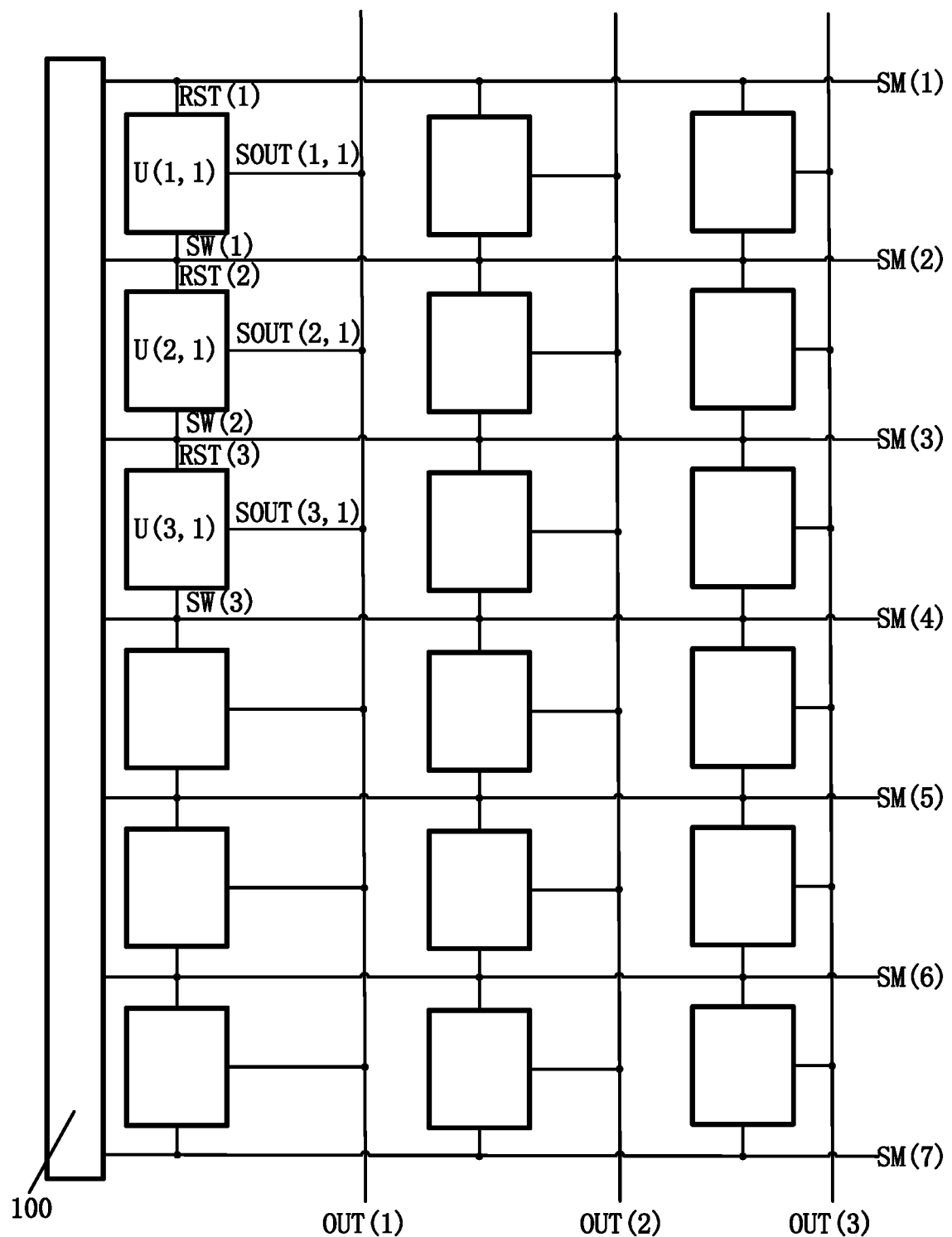
FIG. 3 is a first schematic structural diagram of a fingerprint recognition panel provided by an embodiment of the present disclosure.
Figure 7:
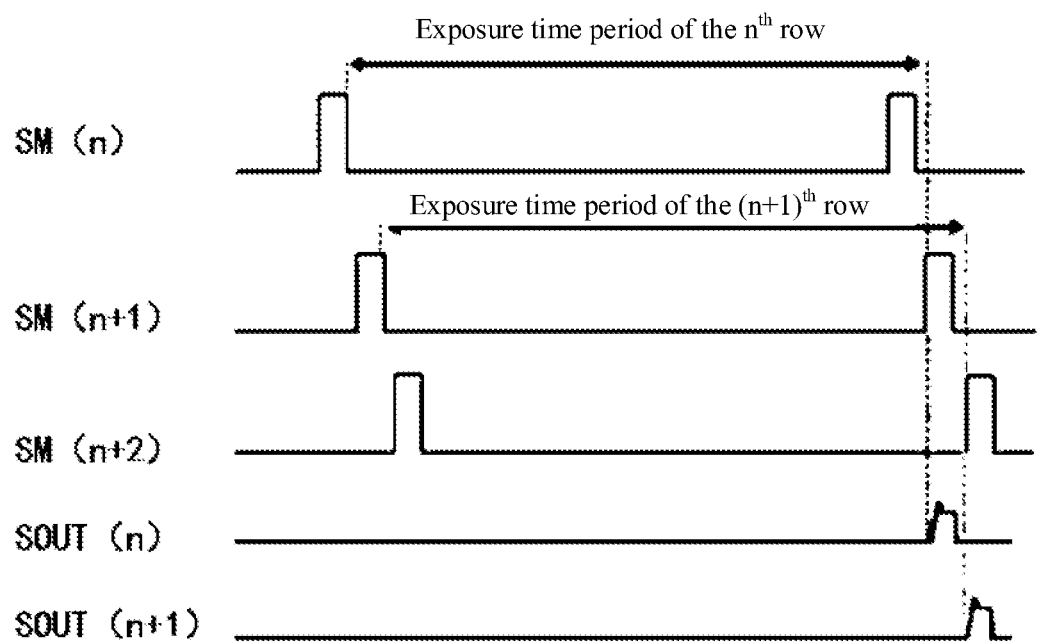
FIG. 7 is a sequence diagram corresponding to the fingerprint recognition panel shown in FIG. 5.

As shown in FIG. 3 and FIG. 5, the second scanning line in corresponding connection with the reset control end RST(n) of the fingerprint recognition circuit U(n,k) of the $n^{th}$ row and the first scanning line in corresponding connection with the reading control end SW(n−1) of the fingerprint recognition circuit U(n−1,k) of the $(n-1)^{th}$ row are the same scanning line SM(n−1). The corresponding sequence diagram is as shown in FIG. 7. In the reset stage, the gate driving circuit outputs scanning signals to the scanning lines SM(1), SM(2), . . . , SM(n), SM(n+1), SM(n+2), . . . , SM(N+1) successively. When the gate driving circuit 100 outputs the scanning signal to the scanning line SM(n−1), the reset module 03 of the fingerprint recognition circuit U(n,k) of the $n^{th}$ row resets the driving transistor TQ under control of the scanning line SM(n−1). In the signal reading stage, the gate driving circuit 100 outputs scanning signals to the scanning lines SM(1), SM(2), . . . , SM(n), SM(n+1), SM(n+2), . . . , SM(N+1) successively. When the gate driving circuit outputs the scanning signal to the scanning line SM(n), the reading control module 01 of the fingerprint recognition circuit U(n,k) of the $n^{th}$ row outputs a signal to the signal output end SOUT(n) under control of the scanning line SM(n).

In this way, in the fingerprint recognition panel provided by the embodiments of the present application, the fingerprint recognition circuit(s) of each row is in corresponding connection with two different scanning lines respectively. The reset control end(s) of the fingerprint recognition circuit(s) of each row is in corresponding connection with one second scanning line, and the reading control end(s) of the fingerprint recognition circuit(s) of each row is in corresponding connection with one first scanning line. Therefore, the reset control modules in the fingerprint recognition circuits of respective rows in the fingerprint recognition panel are in a cascading relationship, and the reading control modules in the fingerprint recognition circuits of the respective rows are in a cascading relationship. Hence, the exposure time periods of the fingerprint recognition circuits of the respective rows in the fingerprint recognition panel are same, and it is ensured that fingerprint images collected from the respective rows are consistent in brightness and definition. In addition, the second scanning line in corresponding connection with the reset control end of the fingerprint recognition circuit of the $n^{th}$ row and the first scanning line in corresponding connection with the reading control end of the fingerprint recognition circuit of the (n−1)th row are disposed to be the same scanning line, so that resetting and reading can be realized by adopting only one gate driving circuit, additional gate driving circuits are not needed, and design of a narrow frame is facilitated.

Figure 4:
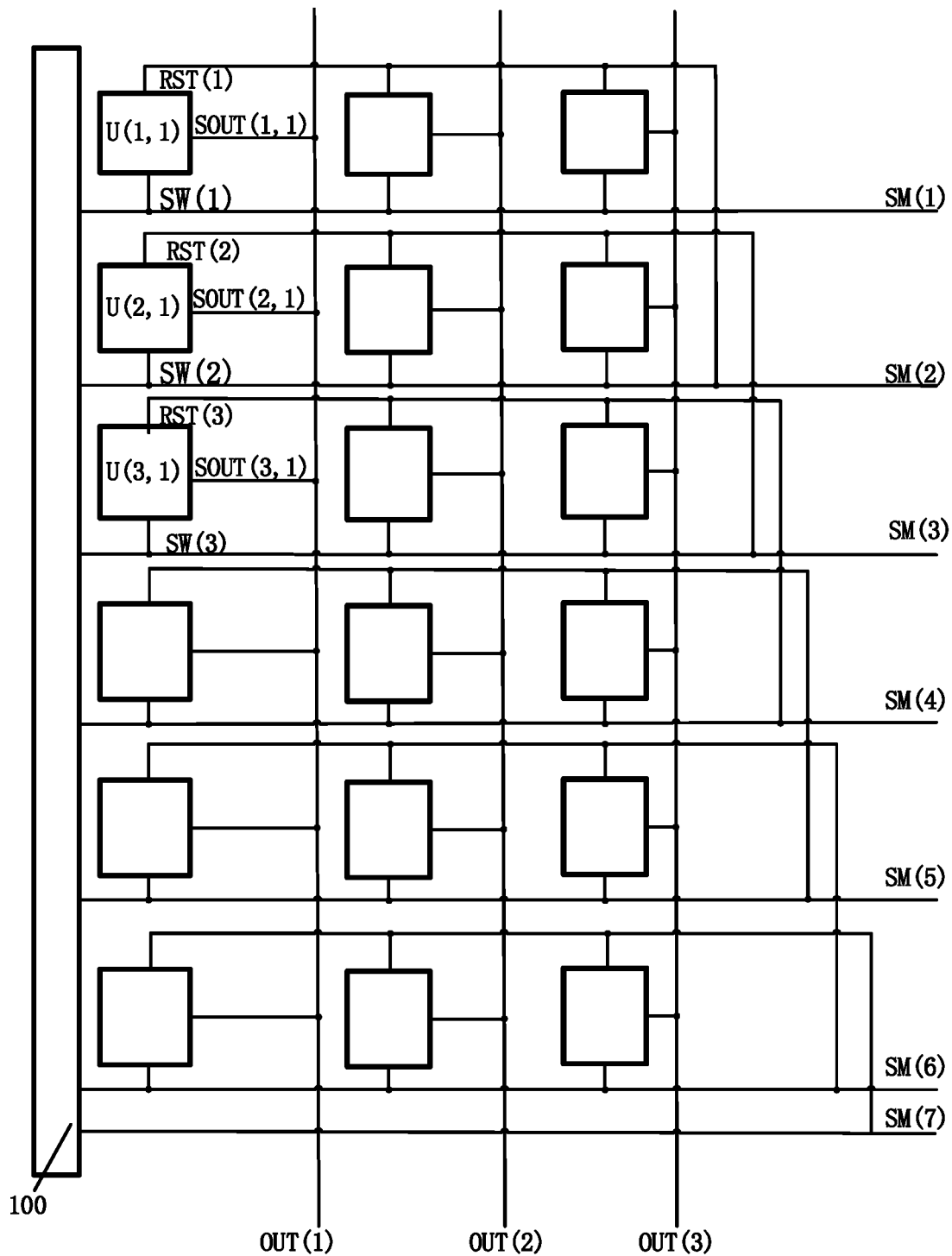
FIG. 4 is a second schematic structural diagram of a fingerprint recognition panel provided by an embodiment of the present disclosure.
Figure 8:
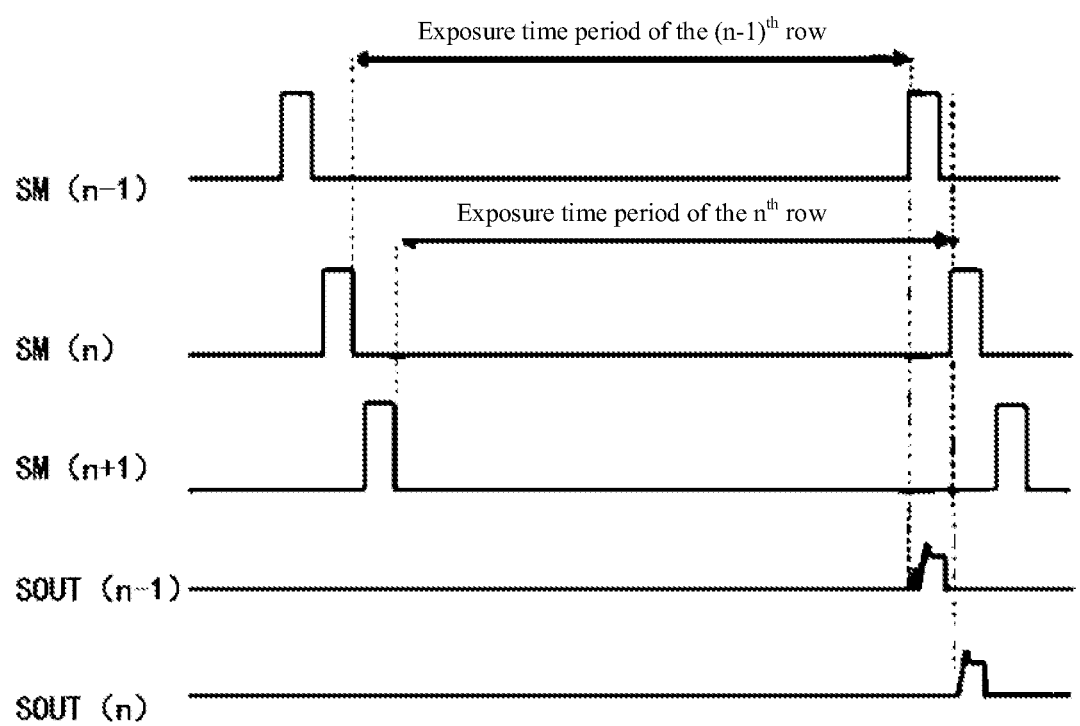
FIG. 8 is a sequence diagram corresponding to the fingerprint recognition panel shown in FIG. 6.

Alternatively, as shown in FIG. 4 and FIG. 6, the first scanning line in corresponding connection with the reading control end SW(n) of the fingerprint recognition circuit U(n,k) of the $n^{th}$ row and the second scanning line in corresponding connection with the reset control end RST (n−1) of the fingerprint recognition circuit U(n−1,k) of the (n−1)th row are the same scanning line SM(n). The corresponding sequence diagram is as shown in FIG. 8. In the reset stage, the gate driving circuit outputs scanning signals to the scanning lines SM(1), SM(2), . . . , SM(n−1), SM(n), SM(n+1), . . . , SM(N+1) successively. The corresponding sequence diagram is as shown in FIG. 8. Then, when the gate driving circuit 100 outputs the scanning signal to the scanning line SM(n+2), the reset module 03 of the fingerprint recognition circuit U(n,k) of the $n^{th}$ row resets the driving transistor TQ under control of the scanning line SM(n+2). In the signal reading stage, the gate driving circuit 100 outputs scanning signals to the scanning lines SM(1), SM(2), . . . , SM(n−1), SM(n), SM(n+1), . . . , SM(N+1) successively. When the gate driving circuit 100 outputs the scanning signal to the scanning line SM(n+1), the reading control module 01 of the fingerprint recognition circuit U(n,k) of the $n^{th}$ row outputs a signal to the signal output end SOUT(n) under control of the scanning line SM(n+1).

In this way, in the fingerprint recognition panel provided by the embodiments of the present application, the fingerprint recognition circuit(s) of each row is in corresponding connection with two different scanning lines respectively, the reset control end(s) of the fingerprint recognition circuit(s) of each row is in corresponding connection with one second scanning line, and the reading control end(s) of the fingerprint recognition circuit(s) of each row is in corresponding connection with one first scanning line. Therefore, the reset control modules in the fingerprint recognition circuits of the respective rows in the fingerprint recognition panel are in a cascading relationship, and the reading control modules in the fingerprint recognition circuits of the respective rows are in a cascading relationship. Hence, the exposure time periods of the fingerprint recognition circuits of the respective rows in the fingerprint recognition panel are same, and fingerprint images collected from the respective rows are consistent in brightness and definition. In addition, the first scanning line in corresponding connection with the reading control end of the fingerprint recognition circuit of the $n^{th}$ row and the second scanning line in corresponding connection with the reset control end of the fingerprint recognition circuit of the $(n-1)^{th}$ row are disposed to be the same scanning line, so that resetting and reading can be realized by adopting only one gate driving circuit, additional gate driving circuits are not needed, and design of a narrow frame is facilitated.

It should be noted that in the present application, FIG. 4 to FIG. 6 are illustrated with m=1 as the case. During specific implementation, m may be any integer larger than 1 and smaller than N. However, the larger m results in more rows needing to be spanned during cascading and meanwhile more scanning lines needed. Therefore, in the fingerprint recognition panel provided by the embodiments of the present disclosure, the smaller the value of m is, the simpler the overall structure of the fingerprint recognition panel is.

Optionally, in the fingerprint recognition panel provided by the embodiments of the present disclosure, m=1. In this way, the fingerprint recognition circuit of each row is cascaded with the fingerprint recognition circuit of an adjacent row. In addition, the number of scanning lines needed is only one row more than the number of the rows of the fingerprint recognition circuits. In this way, the overall structure of the fingerprint recognition panel is as simple as possible.

Figure 9:
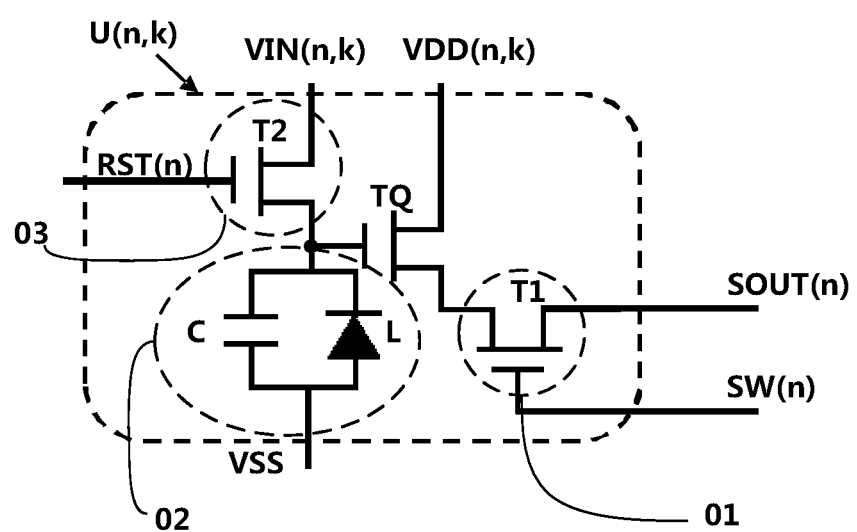
FIG. 9 is a schematic structural diagram of a fingerprint recognition circuit in a fingerprint recognition panel provided by an embodiment of the present disclosure.

Optionally, in the fingerprint recognition panel of the present application, as shown in FIG. 9, the reading control module 01 includes a first switch transistor T1. The first electrode of the first switch transistor T1 is connected with the drain electrode of the driving transistor TQ; a gate of the first switch transistor T1 is connected with the reading control end SW(n); and a second electrode of the first switch transistor is connected with the signal output end SOUT(n).

In some embodiments, in the signal reading stage, when the first scanning line provides the scanning signal, the first switch transistor T1 is switched on, so that the fingerprint recognition circuit U(n,k) outputs an electric signal of a fingerprint image to the signal output end SOUT(n). In this way, by taking one switch transistor as the reading control module, the circuit is simplified, and production cost is reduced.

Optionally, in the fingerprint recognition panel of the present application, as shown in FIG. 9, the photo-electric conversion module 02 includes a capacitor C and a photo-electric diode L, the capacitors C are in parallel connection with the photo-electric diodes L, a cathode of the photo-electric diode L is connected with the gate of the driving transistor TQ, and an anode of the photo-electric diode L is connected with a bias voltage end VSS.

In some embodiments, when the reset modules 03 realize resetting under control of the second scanning line, the capacitor C is charged. Then, resetting of the reset modules 03 is stopped and the capacitor C is discharged to drive the photo-electric diodes L. When the fingerprint recognition panel is pressed by a finger, due to different thicknesses of fingerprints of the finger, photo signals obtained by the fingerprint recognition panel at respective fingerprint recognition circuits are different in light intensity. The resistance of the photo-electric diodes L changes under influences of the photo signals with different light intensities, so that a current in a loop of the capacitor C and the photo-electric diode L change under these influences. A drain current of the driving transistor TQ is in correspondingly correlated relation with a gate current of the driving transistor, so that the current in the loop of the capacitor C and the photo-electric diode L finally influences the drain current of the driving transistor TQ, and thus the drain current is input into the reading control modules 01 as a fingerprint image signal. In this way, the fingerprint recognition panel converts the photo signals into electric signals, facilitating processing of the signals by subsequent circuits.

Optionally, in the fingerprint recognition panel of the present application, as shown in FIG. 9, the reset module 03 includes a second switch transistor T2, a second electrode of the second switch transistor T2 is connected with the gate of the driving transistor TQ; and a gate of the second switch transistor T2 is connected with the reset control end RST(n).

In some embodiments, when the reset control end RST(n) connected with the gate of the second switch transistor provides the scanning signal, the second switch transistor T2 is switched on, and the fingerprint recognition circuit U(n,k) carries out resetting; and when the reset control end RST(n) withdraw the scanning signal, the second switch transistor T2 is switched off, and the fingerprint recognition circuit U(n,k) stops the resetting. In this way, by taking one switch transistor as the reset module, the circuit is simplified, and production cost is reduced.

Optionally, the fingerprint recognition panel further includes a plurality of reset signal lines and a plurality of reference voltage lines.

Reset signal ends of the fingerprint recognition circuits of each row or the reset signal ends of the fingerprint recognition circuits of each column are in corresponding connection with one of the reset signal lines.

Reference voltage ends of the fingerprint recognition circuits of each row or the reference voltage ends of the fingerprint recognition circuits of each column are in corresponding connection with one of the reference voltage lines.

In this way, through multiplexing of the reset signal lines and the reference voltage lines, the structure of the fingerprint recognition panel is simplified, and the difficulty in production and manufacture is reduced.

In the fingerprint recognition panel of the present application, the structure of the fingerprint recognition panel shown in FIG. 4 will be taken as the example for illustration as follows, but it is not limited to this.

Figure 10:
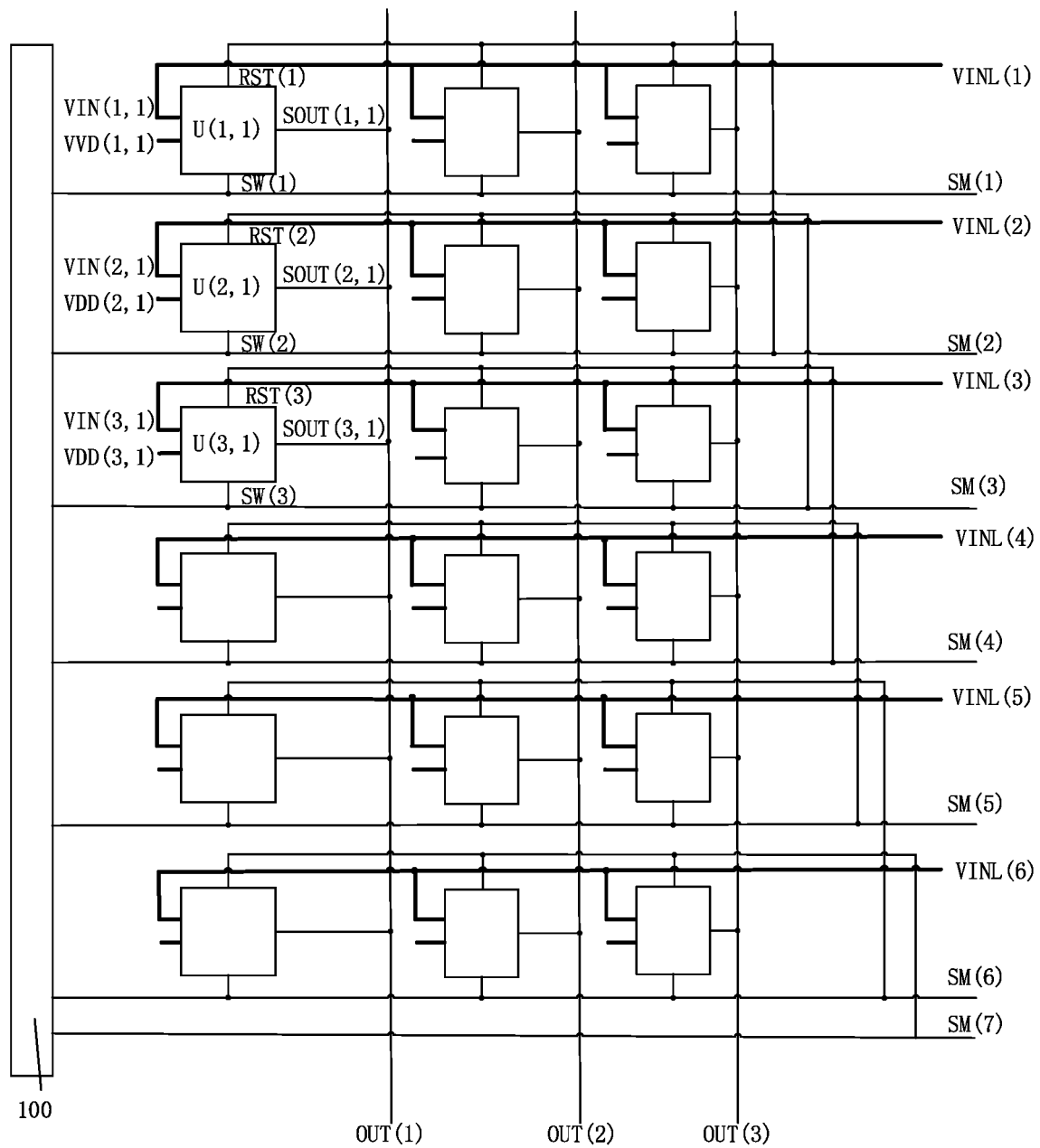
FIG. 10 is a third schematic structural diagram of a fingerprint recognition panel provided by an embodiment of the present disclosure.

Optionally, as shown in FIG. 10, the reset signal ends VIN(n,k) of the fingerprint recognition circuits U(n,k) of each row are in corresponding connection with one of the reset signal lines VINL(n).

Both the reset signal lines VINL and the scanning lines SM extend in a row direction.

The reset signal lines VINL and the scanning lines SM are disposed to be at the same layer and of the same material.

In this way, the reset signal ends of the fingerprint recognition circuits of the same row are connected with the same reset signal line, and the reset signal lines and the scanning lines are disposed to be at the same layer and of the same material, so that the structure of the fingerprint recognition panel is simplified, the production technique is simplified, and cost in production and manufacture is reduced.

Figure 11:
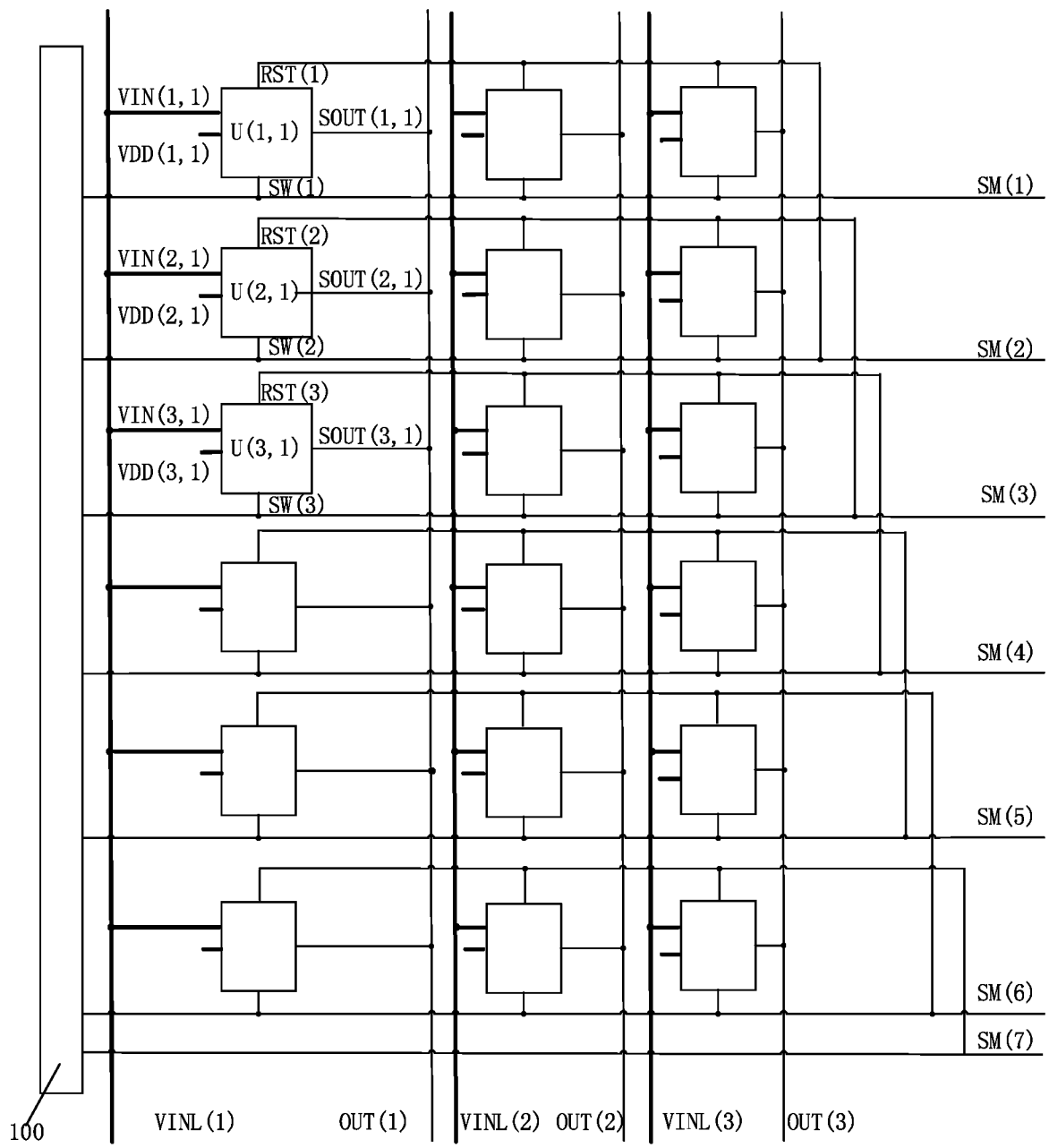
FIG. 11 is a fourth schematic structural diagram of a fingerprint recognition panel provided by an embodiment of the present disclosure.

Optionally, as shown in FIG. 11, the reset signal ends VIN(n,k) of the fingerprint recognition circuits U(n,k) of each column are in corresponding connection with one of the reset signal lines VINL(k).

Both the reset signal lines VINL and the reading signal lines OUT extend in a column direction.

The reset signal lines VINL and the reading signal lines OUT are disposed to be at the same layer and of the same material.

In this way, the reset signal ends of the fingerprint recognition circuits of the same column are connected with the same reset signal line, and the reset signal lines and the reading signal lines are disposed to be at the same layer and of the same material, so that the structure of the fingerprint recognition panel is simplified, the production technique is simplified, and cost in production and manufacture is reduced.

Figure 12:
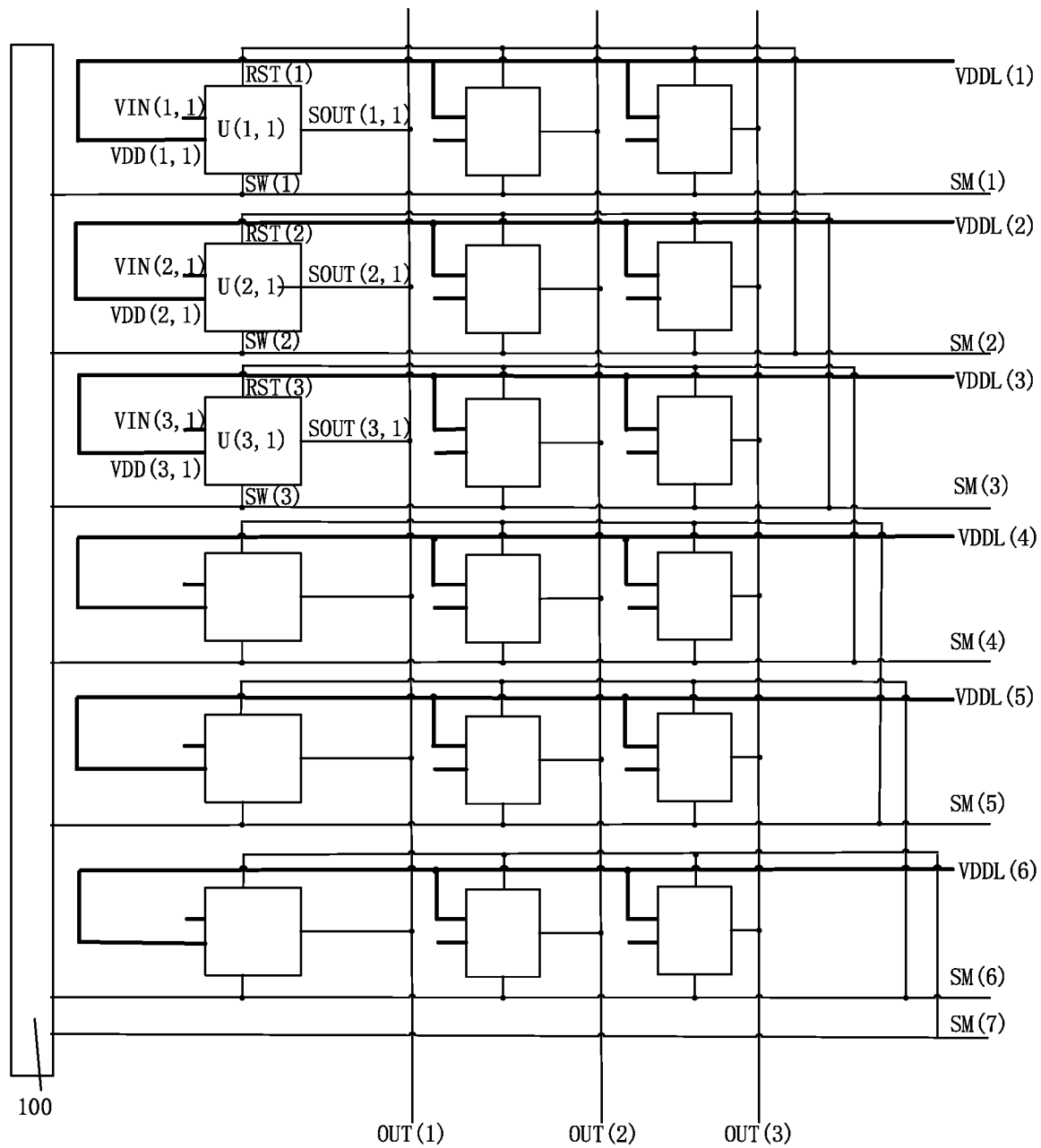
FIG. 12 is a fifth schematic structural diagram of a fingerprint recognition panel provided by an embodiment of the present disclosure.

Optionally, as shown in FIG. 12, the reference voltage ends VDD(n,k) of the fingerprint recognition circuits U(n,k) of each row are in corresponding connection with one of the reference voltage lines VDDL(n).

Both the reference voltage lines VDDL and the scanning lines SM extend in a row direction.

The reference voltage lines VDDL and the scanning lines SM are disposed to be at the same layer and of the same material.

In this way, the reference voltage ends of the fingerprint recognition circuits of the same row are connected with the same reference voltage line, and the reference voltage lines and the scanning lines are disposed to be at the same layer and of the same material, so that the structure of the fingerprint recognition panel is simplified, the production technique is simplified, and cost in production and manufacture is reduced.

Figure 13:
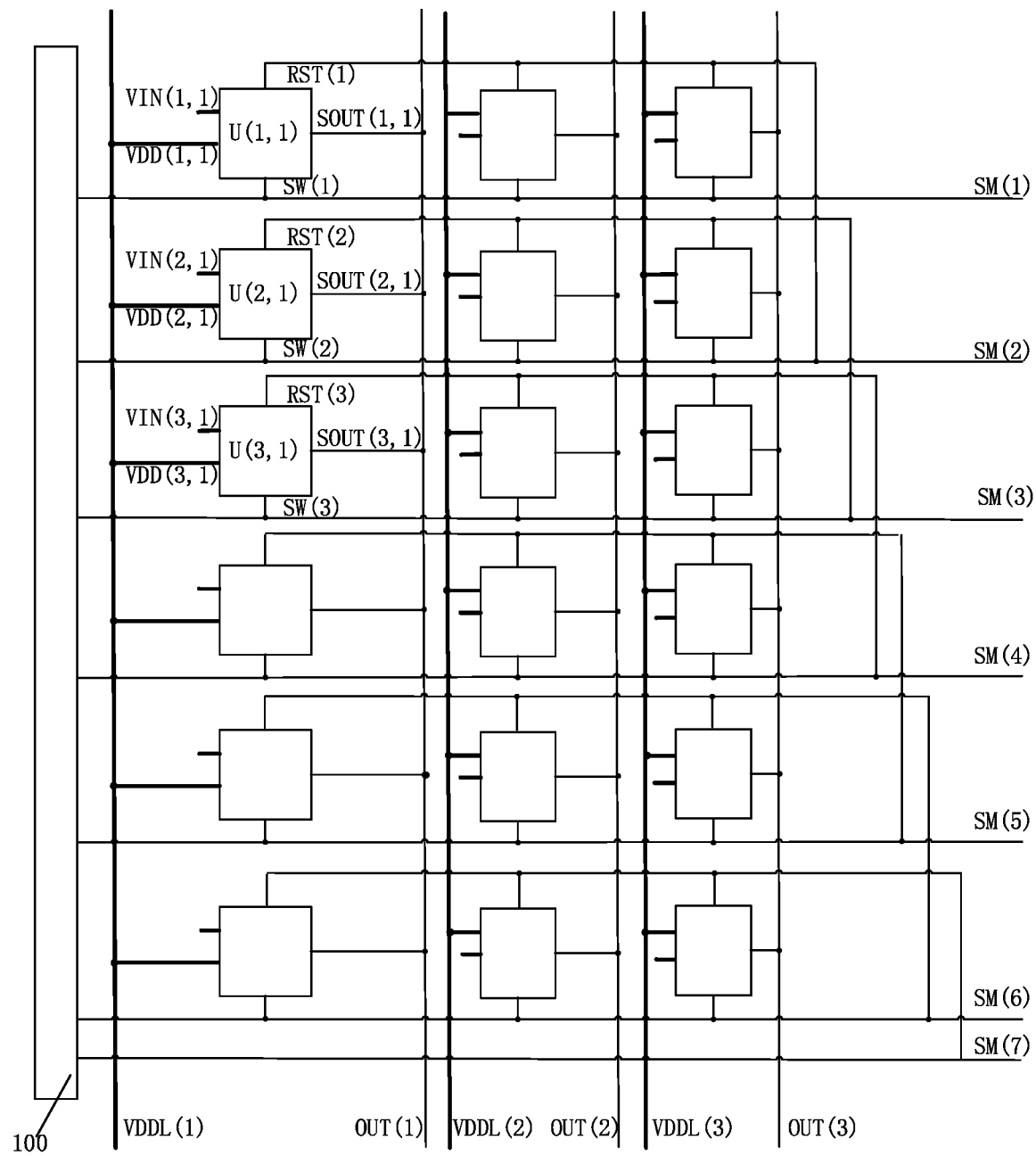
FIG. 13 is a sixth schematic structural diagram of a fingerprint recognition panel provided by an embodiment of the present disclosure.

Optionally, as shown in FIG. 13, the reference voltage ends VDD(n,k) of the fingerprint recognition circuits U(n,k) of each column ate in corresponding connection with one of the reference voltage lines VDDL(k).

Both the reference voltage lines VDDL and the reading signal lines OUT extend in a column direction.

The reference voltage lines VDDL and the reading signal lines OUT are disposed to be at the same layer and of the same material.

In this way, the reference voltage ends of the fingerprint recognition circuits of the same column are connected with the same reference voltage line, and the reference voltage lines and the reading signal lines are disposed to be at the same layer and of the same material, so that the structure of the fingerprint recognition panel is simplified, the production technique is simplified, and cost in production and manufacture is reduced.

Based on the same invention concept, the embodiments of the present disclosure further provide a display device including any of the above fingerprint recognition panels provided by the embodiments of the present disclosure. The display device may be: a mobile phone, a tablet computer, a notebook computer or any other product or component with a display function. Implementation of the display device refers to the embodiments of the display panel. Repeated parts will not be described in detail here.

According to the fingerprint recognition panel and the display device provided by the embodiments of the present disclosure, the fingerprint recognition circuits are arranged in a matrix in the fingerprint recognition panel, the reset modules of fingerprint recognition circuits of a row and the reading control modules of fingerprint recognition circuits of another row are connected by the same signal scanning line, the row and the another row are spaced by several row(s), so that a cascading structure is formed. The signal scanning lines are scanned and controlled row by row by the gate driving circuit on the panel in the reset stage and the signal reading stage, so that the reset modules and the reading control modules of all the fingerprint recognition circuits can work row by row. In this way, the exposure time periods of the fingerprint recognition panel towards fingerprint images of the respective rows are the same, and thus the exposure time periods of all the fingerprint recognition circuits towards the fingerprint images are the same. Therefore, uniformity in brightness and definition of fingerprint signals are improved, facilitating quicker and more accurate recognition of the fingerprint image signals by the fingerprint recognition chip.

Obviously, those skilled in the art can make various modifications and variations to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A fingerprint recognition panel, comprising:
a plurality of fingerprint recognition circuits arranged in a matrix;
a plurality of reading signal lines;
a gate driving circuit; and
a plurality of scanning lines connected with the gate driving circuit;
wherein each of the fingerprint recognition circuits comprises:
a reset module;
a photo-electric conversion module;
a driving transistor; and
a reading control module;
wherein the gate driving circuit is configured to output scanning signals to the plurality of scanning lines successively;
in the each fingerprint recognition circuit:
the reset module is connected with a reset control end, a reset signal end and a gate of the driving transistor respectively and configured to provide a signal of the reset signal end to the gate of the driving transistor under control of the reset control end;
the photo-electric conversion module is connected with the gate of the driving transistor and configured to convert a photo signal to an electric signal;
a source electrode of the driving transistor is connected with a reference voltage end, and a drain electrode of the driving transistor is connected with the reading control module and configured to output a signal to the reading control module under control of a gate potential of the driving transistor; and the reading control module is connected with a reading control end, a signal output end and the drain electrode of the driving transistor respectively and configured to provide the signal output by the driving transistor to the signal output end under control of the reading control end;

the fingerprint recognition circuits in each row are in connection with two different scanning lines, wherein the reading control ends of the reading control modules are connected with a first scanning line, and the reset control ends of the reset modules are connected with a second scanning line; and signal output ends of the fingerprint recognition circuits of each column are in corresponding connection with one of the reading signal lines; and the second scanning line in connection with the fingerprint recognition circuits of the $n^{th}$ row and the first scanning line in connection with the fingerprint recognition circuits of the $(n-m)^{th}$ row are the same scanning line; n is a positive integer larger than 1 and smaller than or equal to N; N is a total number of rows of the fingerprint recognition circuits, and is larger than 1; and m is a positive integer smaller than n.

2. The fingerprint recognition panel according to claim 1, wherein m=1.

3. The fingerprint recognition panel according to claim 1, wherein the reading control module comprises a first switch transistor, wherein:
a first electrode of the first switch transistor is connected with the drain electrode of the driving transistor;
a gate of the first switch transistor is connected with the reading control end; and
a second electrode of the first switch transistor is connected with the signal output end.

4. The fingerprint recognition panel according to claim 1, wherein the photo-electric conversion module comprises:
a capacitor; and
a photo-electric diode;
wherein a cathode of the photo-electric diode is connected with the gate of the driving transistor, and the capacitor is in parallel connection with the photo-electric diode.

5. The fingerprint recognition panel according to claim 1, wherein the reset module comprises a second switch transistor, wherein:
a first electrode of the second switch transistor is connected with the reset signal end;
a second electrode of the second switch transistor is connected with the gate of the driving transistor; and
a gate of the second switch transistor is connected with the reset control end.

6. The fingerprint recognition panel according to claim 1, wherein the reset signal ends of the fingerprint recognition circuits of each row are in connection with one of the reset signal lines;
the reset signal lines and the scanning lines both extend in a row direction; and
the reset signal lines and the scanning lines are disposed to be at a same layer and of a same material.

7. The fingerprint recognition panel according to claim 1, wherein the reset signal ends of the fingerprint recognition circuits of each column are in connection with one of the reset signal lines;
the reset signal lines and the reading signal lines both extend in a column direction; and
the reset signal lines and the reading signal lines are disposed to be at a same layer and of a same material.

8. The fingerprint recognition panel according to claim 1, wherein the reference voltage ends of the fingerprint recognition circuits of each row are in connection with one of the reference voltage lines;
the reference voltage lines and the scanning lines both extend in a row direction; and
the reference voltage lines and the scanning lines are disposed to be at a same layer and of a same material.

9. The fingerprint recognition panel according to claim 1, wherein the reference voltage ends of the fingerprint recognition circuits of each column are in connection with one of the reference voltage lines;
the reference voltage lines and the reading signal lines both extend in a column direction; and
the reference voltage lines and the reading signal lines are disposed to be at a same layer and of a same material.

10. A display device, comprising the fingerprint recognition panel according to claim 1.

11. The fingerprint recognition panel according to claim 1, further comprising:
a plurality of reset signal lines; and
a plurality of reference voltage lines;
wherein the reset signal ends of the fingerprint recognition circuits of each row or the reset signal ends of the fingerprint recognition circuits of each column are in connection with one of the reset signal lines; and
the reference voltage ends of the fingerprint recognition circuits of each row or the reference voltage ends of the fingerprint recognition circuits of each column are in connection with one of the reference voltage lines.

* * * * *